US012755535B2

(12) United States Patent
Dunlap, Jr. et al.

(10) Patent No.: US 12,755,535 B2
(45) **Date of Patent: *Oct. 6, 2026**

(54) AUDIO DATA SELECTION FOR VIDEO MATCHING USING GENERATIVE ARTIFICIAL INTELLIGENCE MODEL

(71) Applicant: Beacon Street Technologies, LLC, Bozeman, MT (US)

(72) Inventors: Daniel David Dunlap, Jr., Pittsburgh, PA (US); Andrew Jerome Feltenstein, Bozeman, MT (US); John Amor Nau, Los Angeles, CA (US)

(73) Assignee: Beacon Street Technologies, LLC, Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/367,541

(22) Filed: Oct. 23, 2025

(65) Prior Publication Data

US 2026/0051170 A1 Feb. 19, 2026

Related U.S. Application Data

(63) Continuation of application No. 19/297,815, filed on Aug. 12, 2025, which is a continuation-in-part of application No. 19/070,361, filed on Mar. 4, 2025, now Pat. No. 12,444,195.

(60) Provisional application No. 63/659,104, filed on Jun. 12, 2024.

(51) Int. Cl.

| | |
|---|---|
| ***G06V 20/40*** | (2022.01) |
| ***G06F 3/04847*** | (2022.01) |
| ***G06F 16/635*** | (2019.01) |
| ***G06F 16/638*** | (2019.01) |
| ***G11B 27/036*** | (2006.01) |
| *G06V 10/70* | (2022.01) |

(52) U.S. Cl.

CPC .......... *G06V 20/47* (2022.01); *G06F 3/04847* (2013.01); *G06F 16/635* (2019.01); *G06F 16/639* (2019.01); *G06V 20/41* (2022.01); *G11B 27/036* (2013.01); *G06V 10/70* (2022.01)

(58) Field of Classification Search

CPC ........ G06V 20/47; G06V 20/41; G06V 10/70; G06F 3/04847; G06F 16/635; G06F 16/639; G11B 27/036

See application file for complete search history.

(56) References Cited

U.S. PATENT DOCUMENTS

| | | | | |
|---|---|---|---|---|
| 12,444,195 B1 * | 10/2025 | Dunlap, Jr. | ............ | G06V 20/41 |
| 2023/0131850 A1 * | 4/2023 | Cai | ....................... | G06F 16/483<br>707/722 |
| 2023/0245451 A1 * | 8/2023 | Zhang | ................... | G06V 20/46<br>386/241 |

* cited by examiner

*Primary Examiner* — Girumsew Wendmagegn
(74) *Attorney, Agent, or Firm* — Fenwick & West LLP

(57) ABSTRACT

A video editing system leverages a generative artificial intelligence (AI) model to identify songs to overlay on a video. The video editing system extracts a set of key frames from the video and prompts the generative AI model to generate a video narrative for the video. A video narrative is a text description of the plot, theme, feel, or other characteristics of the video. The video editing system uses the video narrative to prompt the generative AI model again to generate a set of descriptor tags for the video based on the video narrative. Descriptor tags are strings that represent themes, features, or characteristics of the song. The video editing system uses an audio tagging system to score a set of songs based on the set of descriptor tags and presents a selected subset of the set of songs based on the scores of the songs.

20 Claims, 4 Drawing Sheets

AUDIO DATA SELECTION FOR VIDEO MATCHING USING GENERATIVE ARTIFICIAL INTELLIGENCE MODEL

CROSS-REFERENCE TO RELATED APPLICATIONS

This application is a continuation of U.S. patent application Ser. No. 19/297,815, filed Aug. 12, 2025, which is a continuation-in-part of U.S. patent application Ser. No. 19/070,361, filed Mar. 4, 2025, now U.S. Pat. No. 12,444,195, which claims the benefit of U.S. Provisional Application No. 63/659,104, entitled "Music Selection for Video Matching using Multi-Modal LLM" and filed Jun. 12, 2024, each of which is incorporated by reference.

BACKGROUND

The process of scoring music for a video generally involves either time-consuming manual selection or reliance on simplistic automated systems. In the manual process, users comb through music libraries to select and overlay the perfect song onto their video, spending a long time searching and often struggling to find songs that convey their intended emotional narrative. On the other hand, existing automated systems typically rely on rudimentary keyword matching between video tags and song lyrics or descriptions. While these systems can simplify the process of finding the right song for a video, they still require a user to spend a lot of time searching through songs.

These difficulties originate from the unstructured nature of both video and music data. While video and audio data may contain information that is computer understandable (e.g., pixel values for a frame of video or a frequency value for a sound wave), determining the narratives, themes, or emotions within such video and audio data requires a level of analysis that is generally beyond the inherent capacity of existing automated systems. Thus, while computing systems may be able to easily identify audio data with particular frequency values, these systems struggle to identify, e.g., "happy" or "sad" songs.

SUMMARY

A video editing system leverages a generative artificial intelligence (AI) model to identify songs to overlay on a video. To identify the songs for a video, the video editing system extracts a set of key frames from the video and prompts the generative AI model to generate a video narrative for the video. A video narrative is a text description of the plot, theme, feel, or other characteristics of the video. The video narrative may include a free text description of the video or may include structured data according to a template or schema.

The video editing system uses the video narrative to prompt the generative AI model again to generate a set of descriptor tags for the video based on the video narrative. Descriptor tags are strings that represent themes, features, or characteristics of the song. For example, a happy video may be associated with descriptor tags such as "Happy," "Joyful," or "Upbeat," whereas a scary video may be associated with descriptor tags such as "Fear," "Sinister," or "Dark." In some embodiments, the descriptor tags describe emotions that a person watching the video would feel or is intended to feel.

In some embodiments, the video editing system uses a natural language description of music relevant to the video to generate a query for the audio tagging system. For example, the video editing system may generate a natural language description of music suited to a received video, detailing relevant characteristics such as genre, tempo, energy, mood, and how these elements may change over time. This description can be limited in length and may specify aspects like whether the music becomes more uplifting or if the instrumentation changes. To create this description, the system may use a prompt for a generative AI model, which includes instructions on how to describe the music, any length restrictions, and may also incorporate the video's narrative, key frames, or metadata.

The video editing system uses an audio tagging system to score a set of songs based on the set of descriptor tags and presents a selected subset of the set of songs based on the scores of the songs. The video editing system may present the selected set of songs to the user through a video editing interface that allows the user to overlay any of the selected songs onto the video. The video editing interface may include user interface elements (e.g., sliders) for increasing or decreasing a number of duplicates of a corresponding descriptor tag are included in a query to the audio tagging system. A user can thereby emphasize or deemphasize certain descriptor tags when the audio tagging system scores songs.

By extracting key frames from the video and using the generative AI model to generate a video narrative and then descriptor tags, the video editing system improves the process for identifying structured characteristics within unstructured data. In particular, the video editing system enables the automatic identification of songs that are likely to be suitable for overlaying on a provided video with minimal human interaction.

DETAILED DESCRIPTION

Figure 1A:
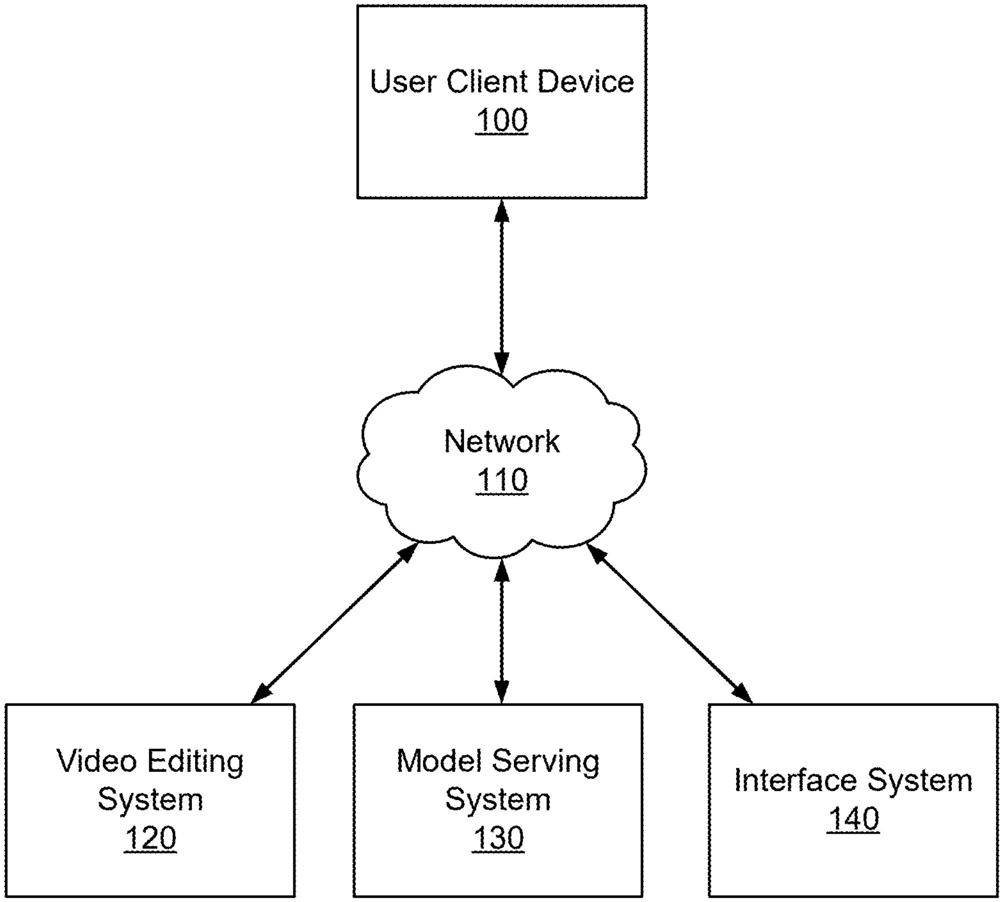
FIG. 1A illustrates an example system environment for a video editing system, in accordance with one or more embodiments.

FIG. 1A illustrates an example system environment for a video editing system 120, in accordance with one or more embodiments. The system environment illustrated in FIG. 1A includes a user client device 100, a network 110, and a video editing system 120. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

Although one user client device 100 is illustrated in FIG. 1A, any number of users may interact with the video editing system 120. As such, there may be more than one user client device 100.

The user client device 100 is a client device through which a user may interact with the video editing system 120. The user client device 100 can be a personal or mobile computing device, such as a smartphone, a tablet, a laptop computer, or desktop computer. In some embodiments, the user client device 100 executes a client application that uses an application programming interface (API) to communicate with the video editing system 120.

The video editing system 120 is an online system that provides video editing services to users through user client devices 100. The video editing system 120 may receive video data from user client devices 100 and edit the video data based on instructions received from the user client devices 100. The video editing system 120 may edit videos by adding video data to a video, removing portions from the video, or replacing portions of video data with other video data. The video editing system 120 also may modify audio data associated with video data. For example, the video editing system 120 may add music to video data. In some embodiments, the video editing system 120 uses a generative AI model to identify music to add to a video. Additional details regarding the use of a generative AI model are described in further detail below.

The user client device 100 and the video editing system 120 can communicate with each other via the network 110. The network 110 is a collection of computing devices that communicate via wired or wireless connections. The network 110 may include one or more local area networks (LANs) or one or more wide area networks (WANs). The network 110, as referred to herein, is an inclusive term that may refer to any or all of the standard layers used to describe a physical or virtual network, such as the physical layer, the data link layer, the network layer, the transport layer, the session layer, the presentation layer, and the application layer. The network 110 may include physical media for communicating data from one computing device to another computing device, such as multiprotocol label switching (MPLS) lines, fiber optic cables, cellular connections (e.g., 3G, 4G, or 5G spectra), or satellites. The network 110 also may use networking protocols, such as TCP/IP, HTTP, SSH, SMS, or FTP, to transmit data between computing devices. In some embodiments, the network 110 may include Bluetooth or near-field communication (NFC) technologies or protocols for local communications between computing devices. The network 110 may transmit encrypted or unencrypted data.

The model serving system 130 receives requests from the video editing system 120 to perform tasks using machine-learned models. The tasks include, but are not limited to, natural language processing (NLP) tasks, audio processing tasks, image processing tasks, video processing tasks, and the like. In one embodiment, the machine-learned models deployed by the model serving system 130 are models configured to perform one or more NLP tasks. The NLP tasks include, but are not limited to, text generation, query processing, machine translation, chatbots, and the like. In one embodiment, the language model is configured as a transformer neural network architecture. Specifically, the transformer model is coupled to receive sequential data tokenized into a sequence of input tokens and generates a sequence of output tokens depending on the task to be performed.

The model serving system 130 receives a request including input data (e.g., text data, audio data, image data, or video data) and encodes the input data into a set of input tokens. The model serving system 130 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learning model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one embodiment, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the video editing system 120 or one or more entities different from the video editing system 120. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one embodiment, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like.

In one embodiment, the task for the model serving system 130 is based on knowledge of the video editing system 120 that is fed to the machine-learned model of the model serving system 130, rather than relying on general knowledge encoded in the model weights of the model. Thus, one objective may be to perform various types of queries on the external data in order to perform any task that the machine-learned model of the model serving system 130 could perform. For example, the task may be to perform question-answering, text summarization, text generation, and the like based on information contained in an external dataset.

Thus, in one embodiment, the video editing system 120 is connected to an interface system 140. The interface system 140 receives external data from the video editing system 120 and builds a structured index over the external data using, for example, another machine-learned language model or heuristics. The interface system 140 receives one or more queries from the video editing system 120 on the external data. The interface system 140 constructs one or more prompts for input to the model serving system 130. A prompt may include the query of the user and context obtained from the structured index of the external data. In one instance, the context in the prompt includes portions of the structured indices as contextual information for the query. The interface system 140 obtains one or more responses from the model serving system 130 and synthesizes a response to the query on the external data. While the video editing system 120 can generate a prompt using the external data as context, often times, the amount of information in the external data exceeds prompt size limitations configured by the machine-learned language model. The interface system 140 can resolve prompt size limitations by generating a structured index of the data and offers data connectors to external data sources.

Figure 1B:
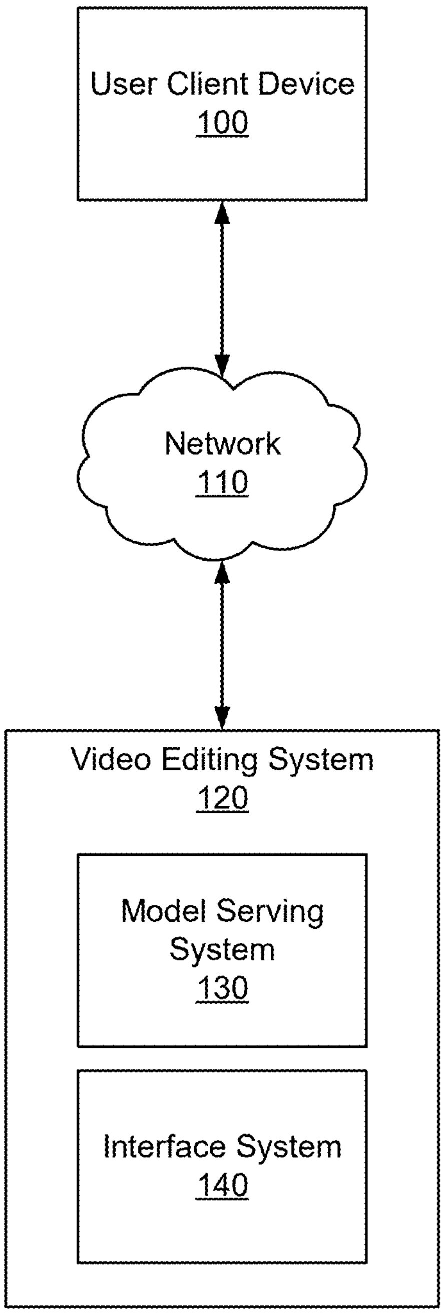
FIG. 1B illustrates an example system environment for a video editing system, in accordance with one or more embodiments.

FIG. 1B illustrates an example system environment for an video editing system 120, in accordance with one or more embodiments. The system environment illustrated in FIG. 1B includes a user client device 100, a network 110, and an video editing system 120. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 130 or the interface system 140 is managed by a separate entity from the video editing system 120. In one embodiment, as illustrated in the example system environment in FIG. 1B, the model serving system 130 or the interface system 140 is managed and deployed by the entity managing the video editing system 120.

Figure 2:
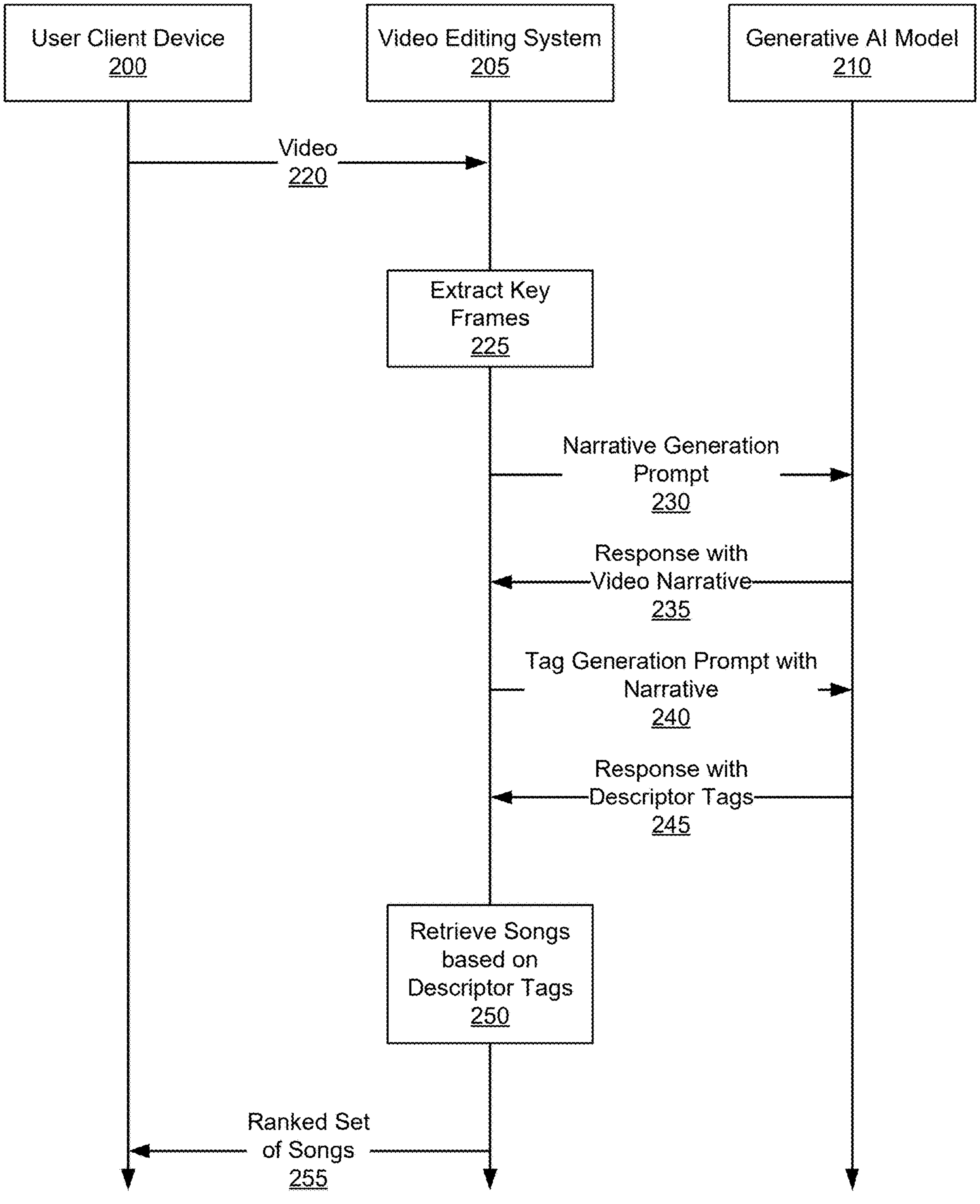
FIG. 2 is an interaction diagram illustrating example interactions of a video editing system with a generative AI model to identify song suggestions for video editing, in accordance with some embodiments.

FIG. 2 is an interaction diagram illustrating example interactions of a video editing system with a generative AI model 210 to identify song suggestions for video editing, in accordance with some embodiments. Alternative embodiments may include more, fewer, or different steps or the steps may be performed in a different order or by different devices from those illustrated in FIG. 2.

A video editing system 205 receives a video 220 from a client device 200. The video editing system may receive the video from the client device directly or the client device may upload the video to a database and the video editing system may access the video from that database. The video may have been captured by a camera of the client device 200 or may have been captured by a separate camera from the client device 200 and uploaded onto the client device from the camera. The video may include audio data that corresponds to the content displayed in the video.

The video editing system extracts 225 key frames from the video. The key frames of a video are frames that differ from each other significantly and encode a significant amount of information representative of similar frames in a group. There are many algorithms that the video editing system may use to identify the keyframes in videos. For example, the video editing system may compare histograms or embeddings generated for frames of the video to identify sets of frames that correspond to different scenes within the video. The video editing system may then use the histograms or embeddings for the frames within each set of frames to identify a frame within each set that is most representative of the scene (e.g., the histogram with values closest to average values or the embedding that is closest to the middle of the embeddings of for the frames within the set of frames).

The video editing system may extract a predetermined number of key frames from the received video. For example, the video editing system may receive from the user client device an indication of how many key frames to extract from the video. Alternatively, the video editing system may dynamically select a number of key frames based on characteristics of the received video. For example, the video editing system may use the length of the video or a determined number of scenes of the video to determine how many key frames to extract from the video.

As noted above, the video editing system uses a generative AI model to identify song suggestions to present to a user for adding to a video. A generative AI model is a machine learning model that generates content based on text prompts input to the generative AI model. The model may use a machine-learning model (e.g., a large language model) for interpreting the text prompts. The machine-learning model may be multi-modal, meaning the model can receive or output non-text data, such as images, video, or audio. The generative AI model may be stored and executed by a model serving system (e.g., model serving system 130). As noted above, the model serving system may be stored and executed by the video editing system or may be provided as a service by a third-party entity.

The video editing system transmits a narrative generation prompt 230 to a generative AI model 210. The narrative generation prompt is a prompt for the generative AI model to generate a video narrative for the video based on the extracted key frames. The video narrative is a text description of the plot, theme, feel, or other characteristics of the video. The video narrative may include a free text description of the video or may include structured data according to a template or schema. The narrative generation prompt includes the extract key frames from the video text instructions to the generative AI model to generate the video narrative for the video. The text instructions may specify how the video narrative should be structured or content should be included in the video narrative. In some embodiments, the narrative generation prompt includes metadata describing the video or the key frames, such as the name of the video, the length of the video, or the timestamps for the key frames.

The video editing system receives a response 235 to the narrative generation prompt from the generative AI model with the video narrative for the video. The video editing system may parse the response to extract the text of the video narrative for the video. In embodiments where the video narrative includes structured data, the video editing system may parse the response to confirm that the text generated by the generative AI model complies with a structure specified in the narrative generation prompt.

The video editing system uses the video narrative to generate a tag generation prompt 240 to transmit to the generative AI model. The tag generation prompt is a prompt for the generative AI model to generate a set of descriptor tags for the video based on the video narrative. The descriptor tags are strings that represent themes, features, or characteristics of the song. For example, a happy video may be associated with descriptor tags such as "Happy," "Joyful," or "Upbeat," whereas a scary video may be associated with descriptor tags such as "Fear," "Sinister," or "Dark." In some embodiments, the descriptor tags describe emotions that a person watching the video would feel or is intended to feel.

The tag generation prompt includes the video narrative and text instructions for the generative AI model to generate a set of descriptor tags for the video based on the video narrative. The text instructions may include a set of candidate descriptor tags from which the generative AI model may select for generating the set of descriptor tags for the video. The text instructions also may include a text description of each descriptor tag describing what the descriptor tag represents. Furthermore, the text instructions may specify a structure in which the descriptor tags should be generated or may specify how many descriptor tags should be generated by the generative AI model. In some embodiments, the tag generation prompt also includes the extracted key frames or metadata for the video and the text instructions specify that the generative AI model should use the extracted key frames or metadata to generate the descriptor tags.

The video editing system receives a response 245 to the tag generation prompt from the generative AI model with the requested set of descriptor tags. The video editing system uses the set of descriptor tags to retrieve 250 a set of songs. For example, the video editing system may use an audio tagging system to retrieve the set of songs. The audio tagging system is a system that identifies and ranks a set of candidate songs based on a text query. For example, the audio tagging system may generate a score for each candidate song that represents how well the candidate song matches the received text query. The audio tagging system may use a machine-learning model (e.g., a neural network or a large language model) to score songs based on a tag. For example, the machine-learning model may be trained to take a song and text as an input and to generate a score that represents an affinity of the text and the song. In some embodiments, the audio tagging system generates embeddings of the text and of the song and compares the embeddings to generate the score. The audio tagging system may be a third-party system with which the video editing system or may be part of the video editing system.

To retrieve the set of songs, the video editing system may upload a library of songs to the audio tagging system to be indexed into a database by the video editing system and query from that database based on the descriptor tags to retrieve the set of songs. Alternatively, the video editing system identifies a set of candidate songs from a locally stored music library and queries the audio tagging system to individual score each song's affinity to the descriptor tags. Regardless, the video editing system obtains a set of songs that are ranked according to scores that represent an affinity of the songs for the descriptor tags for the video.

In some embodiments, instead of or in addition to querying the audio tagging system with generated tags, the video editing system may generate a natural language description of music for the received video. This natural language description describes characteristics of songs that would be relevant to the received video. For example, the natural language description may describe the genre, tempo, energy level, or mood for the song. The natural language description may further specify how the song changes over time, such as whether the song becomes more uplifting over time or if the instruments in the song change. The natural language description may be limited to a certain length, such as a maximum number of characters, words, or sentences.

In some embodiments, the video editing system may generate a description generation prompt for prompting a generative AI model to generate the natural language description. For example, the description generation prompt may include instructions for the generative AI model to generate the natural language description of music for the received video. The instructions may specify how to describe relevant music or may describe limitations on length for the natural language description. The instructions may further include the video narrative for the video and, in some embodiments, the key frames or metadata for the video.

In some embodiments, the description generation prompt is also a tag generation prompt and the instructions also instruct the generative AI model to generate a set of tags for the video. Alternatively, the description generation prompt includes tags generated by the video editing system using a tag generation prompt, as described above.

In some embodiments, the video editing system is configured to iteratively refine the generated natural language description of music based on user feedback. After the system generates an initial natural language description, the user may be presented with the description and provided with options to edit, accept, or reject the output. The system may incorporate user edits or feedback to update the description in real time or in subsequent iterations. This feedback loop enables the system to learn user preferences and improve the relevance and quality of future descriptions. For example, the system may track accepted and rejected suggestions, analyze user-provided modifications, and adjust its description generation algorithms accordingly. In certain embodiments, the system may also allow users to provide explicit feedback on specific aspects of the description, such as genre, mood, or length, further guiding the refinement process. This iterative, human-in-the-loop approach ensures that the generated descriptions align more closely with user expectations and project requirements, and supports collaborative editing workflows for creative applications.

The video editing system transmits the ranked set 255 of songs to the client device for display to the user. The video editing system may transmit the audio data for the songs to the client device directly or may transmit an identifier for each of the set of songs that the user client device can use to identify the song in a local or remote database. The video editing system transmits instructions to the client device to display the ranked set of songs to the user in a user interface. For example, the user client device may display the ranked set of songs through a video editing interface. A video editing interface is a user interface that enables a user to overlay songs on video.

Figure 3:
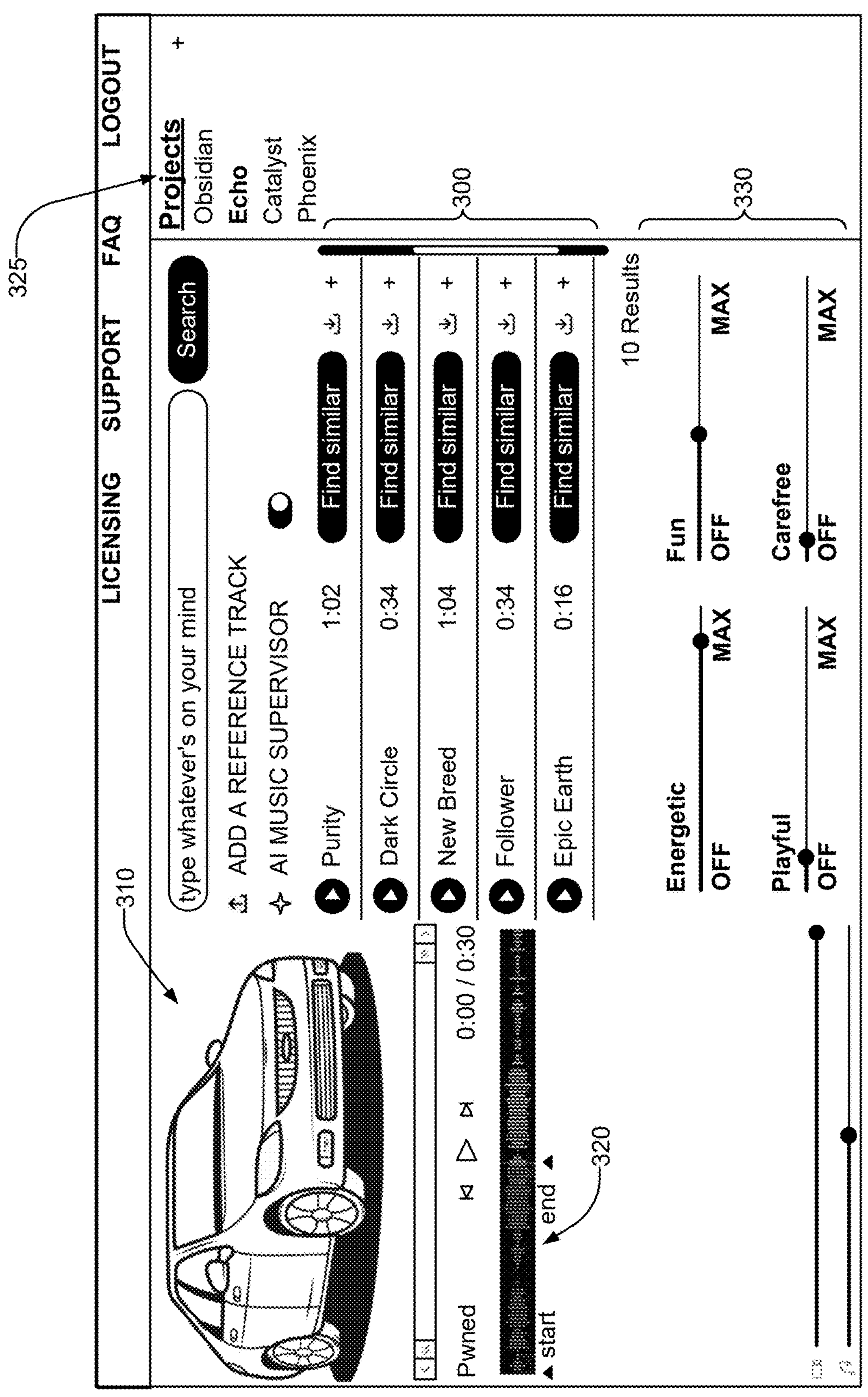
FIG. 3 illustrates an example video editing interface, in accordance with some embodiments.

FIG. 3 illustrates an example video editing interface, in accordance with some embodiments. The video editing interface displays the set of songs 300 in a list that is ranked according to the scores generated by the audio tagging system. The video editing interface also includes a video player 310 through which the user can play the video. The video player may include a UI element 320 through which the user can select where a selected song would start and stop in the video. In some embodiments, the video player includes a UI element through which user can separate a piece of audio into stems and allows the user to adjust the stems individually. The video editing interface further includes a UI element 325 for saving and selecting different projects that the user can work on through the video editing interface. These projects may be saved locally on the user's client device or on a remote server (e.g., on the video editing system). The projects may be shareable with other users so that users can collaborate with each other.

The video editing interface also includes a set of user interface elements 330 for fine tuning the search and indicate the priority of descriptor tags in selecting a song. In the illustrated embodiment, the user interface elements are slider elements, but alternative embodiments may use different user interface elements. Each slider corresponds to one of the descriptor tags generated for the video and the user can adjust each slider to cause the video editing system to reselect a set of songs to present based on the corresponding positions of the sliders. For example, if a user moves the "Energetic" slider further towards the "Max" end of the slider, the video editing system may reapply the song selection process above to identify songs that are more energetic. The video editing interface may include a fine-tuning UI element for each descriptor tag or for only a subset of descriptor tags generated for the video.

To reprioritize based on the fine tune search sliders, the video editing system adds or removes instances of the descriptor tag from the query sent to the audio tagging system. For example, the sliders may start in positions where each descriptor tag is only included once. However, if the user slides the "Fun" slider to the right, the video editing system may adjust the query to the audio tagging system to include a number of duplicates of the "Fun" descriptor tag corresponding to the new position of the slider. The video editing system uses the query with the duplicates of the descriptor tags to re-score the songs and update the list of songs that are presented through the video editing interface.

As noted above, the audio tagging system may use a large language model to identify songs based on a prompt to audio tagging system. In some embodiments, rather than or in addition to including duplicates of a descriptor tag in the prompt to the audio tagging system, the video editing system generates a prompt for the audio tagging system based on a prompt recipe. A prompt recipe describes parameters for a prompt to be generated and sent to the audio tagging system to retrieve songs. For example, the prompt recipe may include weights (e.g., a value from 1-10) for descriptor tags that correspond to where a slider on a slider user interface element is positioned.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method comprising:

receiving a video at a video editing system from a client device;

extracting one or more key frames from the video using a key frame extraction algorithm;

transmitting a narrative generation prompt to a generative AI model, wherein the narrative generation prompt comprises the extracted key frames and text instructions to identify a video narrative for the video;

receiving the video narrative from the generative AI model in a response to the narrative generation prompt;

generating a query for an audio tagging system based on the received video narrative;

retrieving a set of songs and a set of scores from the audio tagging system using the generated query;

ranking the retrieved set of songs based on the retrieved set of scores; and transmitting the ranked set of songs for display to the client device through a video editing interface.

2. The method of claim 1, wherein generating the query for the audio tagging system comprises:

generating a description generation prompt for a generative AI model, wherein the description generation prompt comprises instructions for the generative AI model to generate a natural language description describing music that may be relevant to the video; and generating the query based on the natural language description.

3. The method of claim 2, wherein the description generation prompt comprises a plurality of tags generated by the video editing system using a tag generation prompt.

4. The method of claim 1, wherein generating the query for the audio tagging system comprises:

generating a tag generation prompt for a generative AI model, wherein the tag generation prompt comprises instructions for the generative AI model to generate a plurality of descriptor tags describing music that may be relevant to the video; and generating the query based on the plurality of descriptor tags.

5. The method of claim 4, wherein the tag generation prompt comprises a candidate list of descriptor tags and the text instructions instruct the generative AI model to select from the candidate list of descriptor tags to generate the plurality of descriptor tags.

6. The method of claim 4, wherein the tag generation prompt comprises the video narrative.

7. The method of claim 4, wherein retrieving the set of songs comprises:

receiving, through the video editing interface, a value indicating a priority of a descriptor tag of the plurality of descriptor tags; and generating the query by generating a set of duplicates of the descriptor tag based on the indicated priority.

8. The method of claim 7, wherein the value is received through a slider user interface element corresponding to the descriptor tag.

9. The method of claim 1, wherein extracting the one or more key frames from the video comprises:

receiving a number of key frames to extract from the video from the client device.

10. The method of claim 1, wherein extracting one or more key frames from the video comprises:

determining how many key frames to extract from the video based on characteristics of the video.

11. The method of claim 1, wherein the narrative generation prompt comprises metadata for the video.

12. The method of claim 1, further comprising:

receiving a selection of a song of the ranked set of songs; and modifying the video to include the selected song.

13. A non-transitory computer-readable medium storing computer- executable instructions that, when executed, cause a processor to perform operations comprising:

receiving a video at a video editing system from a client device;

extracting one or more key frames from the video using a key frame extraction algorithm;

transmitting a narrative generation prompt to a generative AI model, wherein the narrative generation prompt comprises the extracted key frames and text instructions to identify a video narrative for the video;

receiving the video narrative from the generative AI model in a response to the narrative generation prompt;

generating a query for an audio tagging system based on the received video narrative;

retrieving a set of songs and a set of scores from the audio tagging system using the generated query;

ranking the retrieved set of songs based on the retrieved set of scores; and transmitting the ranked set of songs for display to the client device through a video editing interface.

14. The computer-readable medium of claim 13, wherein generating the query for the audio tagging system comprises:

generating a description generation prompt for a generative AI model, wherein the description generation prompt comprises instructions for the generative AI model to generate a natural language description describing music that may be relevant to the video; and generating the query based on the natural language description.

15. The computer-readable medium of claim 14, wherein the description generation prompt comprises a plurality of tags generated by the video editing system using a tag generation prompt.

16. The computer-readable medium of claim 13, wherein generating the query for the audio tagging system comprises:

generating a tag generation prompt for a generative AI model, wherein the tag generation prompt comprises instructions for the generative AI model to generate a plurality of descriptor tags describing music that may be relevant to the video; and generating the query based on the plurality of descriptor tags.

17. The computer-readable medium of claim 16, wherein the tag generation prompt comprises a candidate list of descriptor tags and the text instructions instruct the generative AI model to select from the candidate list of descriptor tags to generate the plurality of descriptor tags.

18. The computer-readable medium of claim 16, wherein the tag generation prompt comprises the video narrative.

19. The computer-readable medium of claim 16, wherein retrieving the set of songs comprises:

receiving, through the video editing interface, a value indicating a priority of a descriptor tag of the plurality of descriptor tags; and generating the query by generating a set of duplicates of the descriptor tag based on the indicated priority.

20. The computer-readable medium of claim 19, wherein the value is received through a slider user interface element corresponding to the descriptor tag.

* * * * *